United States Patent [19]

Johansson et al.

[11] 3,905,760

[45] Sept. 16, 1975

[54] OVEN FOR BAKING FOOD PRODUCTS

[75] Inventors: Leif A. T. Johansson, Huddinge; Nils G. Pers, Upplands Vasby, both of Sweden

[73] Assignee: Tipe Revent AB, Stockholm, Sweden

[22] Filed: Jan. 18, 1974

[21] Appl. No.: 434,681

[30] Foreign Application Priority Data

Jan. 26, 1973 Sweden .............................. 7301135

[52] U.S. Cl. .............. 432/176; 126/21 A; 219/400; 432/177
[51] Int. Cl.² ......................................... F27B 3/022
[58] Field of Search .................... 432/175, 176, 177; 219/400; 126/21 A

[56] References Cited
UNITED STATES PATENTS
3,304,071   2/1967   Gentry ............................... 432/176
3,820,525   6/1974   Pond .................................. 219/400

Primary Examiner—John J. Camby
Attorney, Agent, or Firm—Hill, Gross, Simpson, Van Santen, Steadman, Chiara & Simpson

[57] ABSTRACT

Food products are baked in a forced-convection oven having a baking chamber into and out of which a rack carrying the food products on superposed trays may be rolled. Air is circulated horizontally through the baking chamber by a pair of vertically disposed cross-flow fans. The circulating air enters the baking chamber through alternate ones of two opposed side walls, and the major portion of it leaves the baking chamber through the other one of these side walls while a minor portion leaves the baking chamber through a back wall.

6 Claims, 7 Drawing Figures

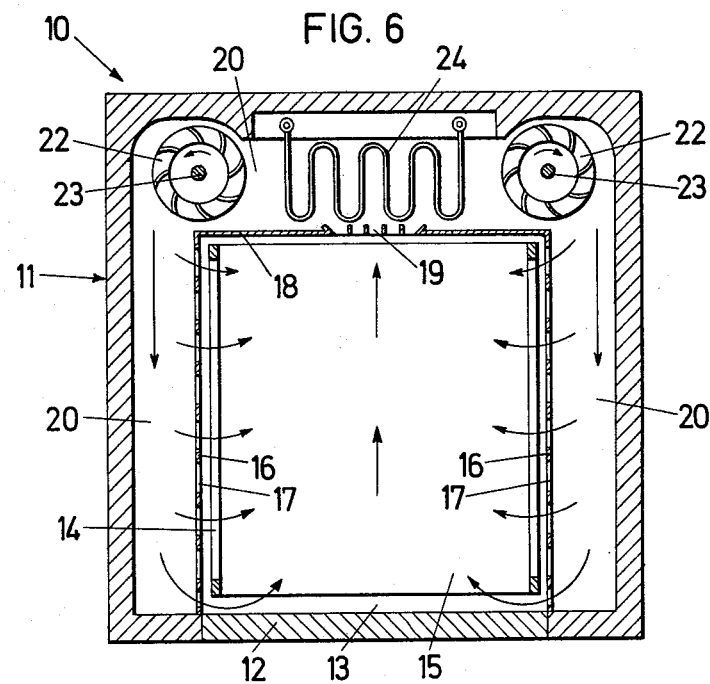
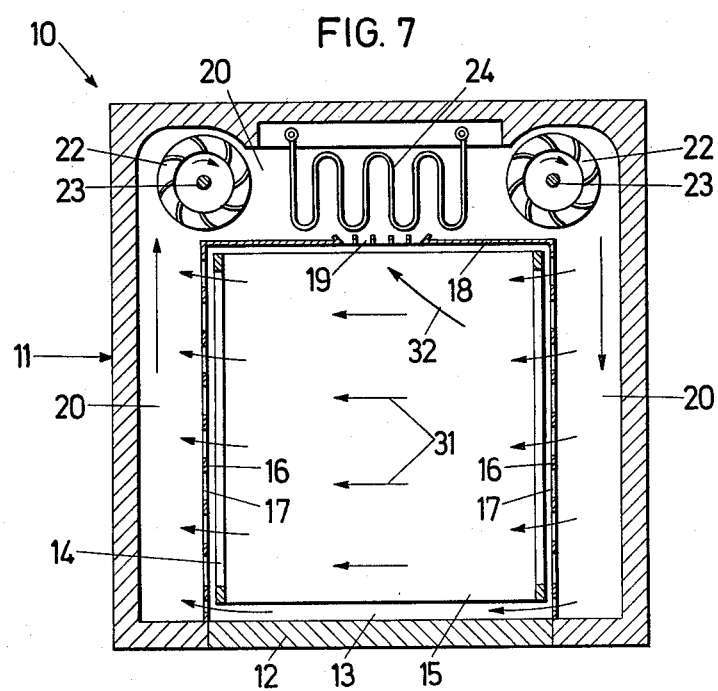

OVEN FOR BAKING FOOD PRODUCTS

BACKGROUND OF THE INVENTION

1. Field of the Invention

This invention relates to ovens of the type in which the food products are supported on a rack which is rolled or otherwise moved into and out of a baking chamber in the oven and in which the baking is effected by means of air circulated through the baking chamber by fan means.

2. Prior Art

Different types of food products may be baked in ovens of this type, so-called rack ovens, and the baking may serve different purposes; for example, the baking may be applied to reconstitute frozen food, to smoke-cure different types of food or to bake bread.

Over the last decade, rack ovens heated by circulating air that is, forced-convection rack ovens, have become quite popular, particularly for baking of bread. The popularity achieved by these ovens is mainly due to the fact that they permit facilitation of the handling of the food products and their transfer between different treatment apparatus while at the same time having a large capacity in relation to their space requirements and price.

A problem with forced-convection rack ovens lies in the difficulty of obtaining uniform treatment of all food products in the rack. To alleviate this problem it has been proposed to reverse the air flow at regular intervals during the baking and/or to continuously reciprocate the rack or rotate it around a vertical shaft within the baking chamber during the baking, for example as described in U.S. Pat. Nos. 3,402,683 and 3,537,405. These expedients have resulted in considerable improvement, but have naturally increased the costs of the ovens at the same time. If the rack is to be reciprocated or rotated continuously during the baking, it is necessary to provide support and drive means within the baking chamber, thereby rendering the cleaning of the baking chamber difficult.

One proposal to the solution of the problem of ensuring a satisfactorily uniform baking while holding the rack stationary during the baking process is based on the use of cross-flow fans (that is, fans in which the air constantly flows radially or perpendicularly to the axis of rotation of the fan rotors) in the air circulation system, instead of the conventionally used centrifugal fans. The use of cross-flow fans makes it easier to obtain uniform distribution of the air and also provides greater possibility of providing an air circulation system which is more advantageous with respect to space economy and air-flow conditions and accessibility for cleaning and maintenance purposes than air circulation systems having centrifugal fans.

Practical tests, however, show that although this proposal affords a step forwards in the art, it does not afford a fully satisfactory solution to the aforementioned problem, but must be developed further in order that a satisfactory result may be obtained also in the case of more demanding baking processes.

BRIEF SUMMARY OF THE INVENTION

The object of the invention is concerned with said further development of this latter proposed solution, and more specifically is concerned with the provision of an oven which fulfils high demands as to uniformity in baking without requiring the food products to be in motion during the baking process.

In accordance with the present invention, cross-flow fans are used to circulate air horizontally through the baking chamber in alternate directions between two opposing side walls of the baking chamber, but instead of permitting all air to flow in the same direction out of the baking chamber through one of these opposing side walls, a small portion of the air is passed horizontally through a third side wall. During practical tests, this simple expedient has been found to give a result which is considerably better than that which can be obtained when all air is caused to flow in a straight path from one side wall to the other.

No positive explanation as to why the deflection of a portion of the air provides a considerably improved result can be given, at least at present; it would be natural to expect that the deflected air should at most afford an improved result in the vicinity of the air outlet in the third side wall but apparently the deflected air also affects the air flow at the fourth side wall.

The baking can be further improved by causing the cross-flow fans to work in opposite directions for a short period of time in conjunction with reversing the flow direction of the air, so that the fans propel air into the baking chamber through both of the opposing side walls. All air is then forced to flow out of the baking chamber through the air outlet in the third side wall.

BRIEF DESCRIPTION OF THE DRAWINGS

FIG. 5–7 are horizontal sectional views along line V—V in FIG. 1. and illustrate the air flow during three sequential phases of a baking cycle.

DESCRIPTION OF THE PREFERRED EMBODIMENT

Figure 1:
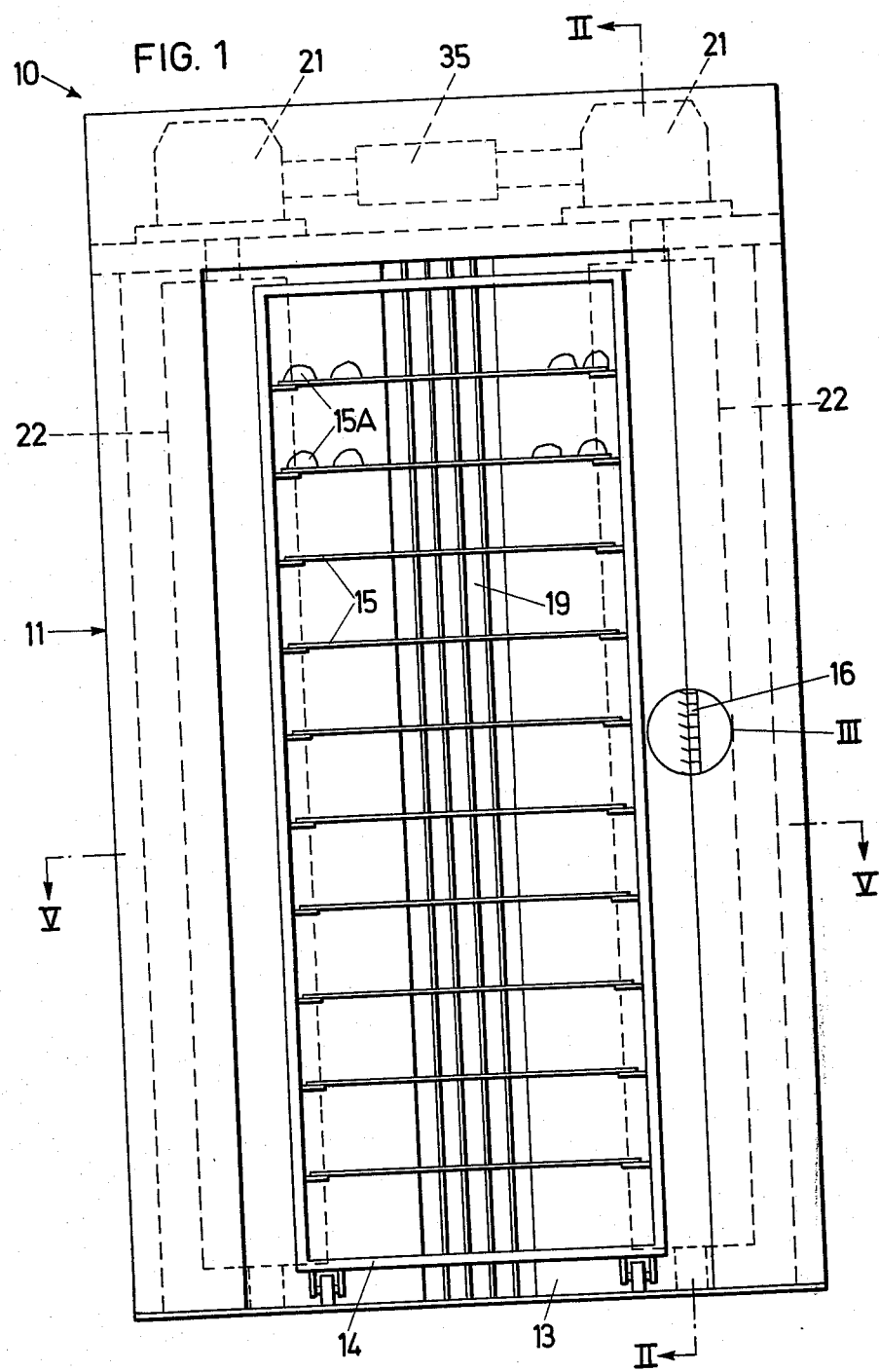
FIG. 1 is a front elevational view of an oven embodying the invention, the door providing access to the baking chamber being omitted.

On the drawings, there is diagrammatically shown a rack oven constructed in accordance with the principles of the present invention, only as much details of construction being shown as are believed necessary to enable any person skilled in the art to make and use the invention.

The illustrated rack oven 10 is of a substantially conventional external construction and thus has a heat-insulated housing 11 including a door 12 on the front side (see FIGS. 2 and 5 to 7). The door 12 provides access to a baking chamber 13 of a height equal to about three fourths or more of the height of the housing 11. When closed, the door 12 forms the front wall of the baking chamber 13 which is adapted to accomodate a wheeled rack 14 having a plurality of trays 15 for supporting the food products 15A to be baked, e.g. meat or bread. The trays 15 are placed one above the other and extend across substantially the whole width of the baking chamber 13 to divide the same into a plurality of superposed sections. The food products 15A are loaded on the trays 15 with the rack 14 located outside the baking chamber, and subsequent to the loading, the rack is rolled into the baking chamber from which it is then rolled out upon completion of the baking process.

In addition to the door 12, the baking chamber 13 is defined horizontally by three vertical walls, all of which for the sake of simplicity are hereinafter referred to as side walls, namely two opposing identical side walls 16 having through-flow openings 17 distributed substantially over the entire surface thereof (see also FIGS. 3 and 4), and a third, rear side wall 18 which extends between the opposing side walls 16 and has a relatively narrow air outlet 19 extending along the vertical center line throughout the height of the baking chamber. In the illustrated embodiment, the baking chamber 13 has a parallelepipedic configuration, but, as will readily be appreciated, may also have other configurations.

Figure 5:
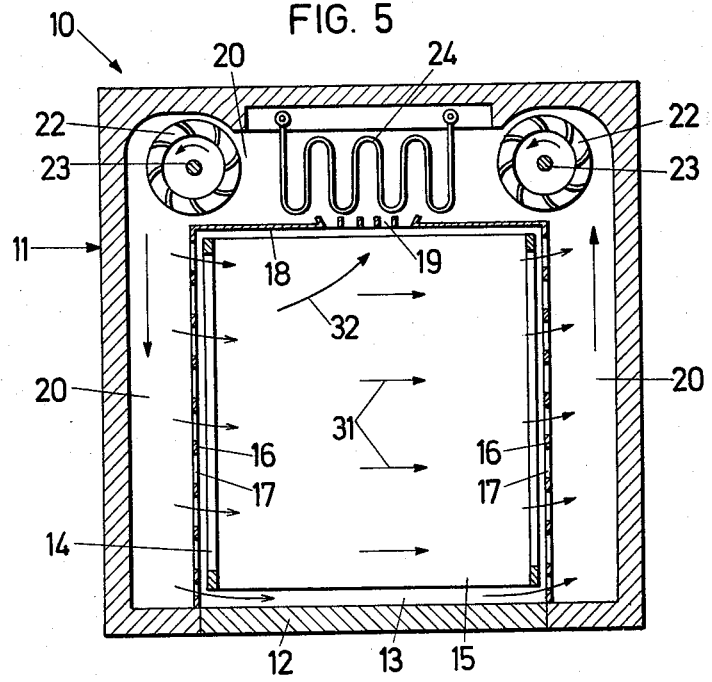

Extending outside of and along the three side walls 16,16,18 is an air passage 20 the vertical extent of which is substantially equal to the height of the baking chamber. The end portions of this air passage are in constant fluid flow communication with each other by way of the openings 17 in the opposing side walls 16 and the baking chamber 13. The air passage 20 and the baking chamber 13 together form an air circulation duct of an air circulation system which also includes two identical fans of the cross-flow type, each of which is driven by its own electric motor 21 and the rotors 22 of which are parallel and rotate around vertical shafts 23 adjacent respective ones of the rear corners of the baking chamber 13 (FIGS. 5 to 7). The two rotors 22 are disposed in opposing or registering relation in the air passage 20 and their length is substantially equal to the height of the baking chamber 13 and, accordingly, the height of the air passage 20.

The rotors 22 are designed and arranged for rotation in opposite directions, namely counterclockwise for the rotor at the left rear corner of the baking chamber, as seen in FIGS. 5 to 7, and clockwise for the other rotor. Both rotors, however, can be disengaged from their drive so that each rotor can be induced to rotate freely by the air flow produced in the passage 20 by the other rotor. In the illustrated embodiment, the fan rotors are fixedly connected to the rotors of the electric motors 21, although there may also be a releasable coupling between the fan rotors and the motor rotors.

In the air passage 20, between the fan rotors 22, there is provided an air conditioning apparatus including an electric heater 24 extending over the entire height of the air passage. The air conditioning apparatus may also include a device for moistening or for other treatment of the circulating air.

Figure 3:
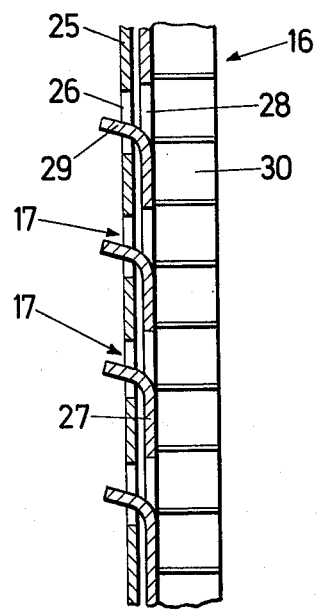
FIG. 3 is a sectional view in larger scale of the portion of a baking chamber side wall marked with a ring III in FIG. 1.
Figure 4:
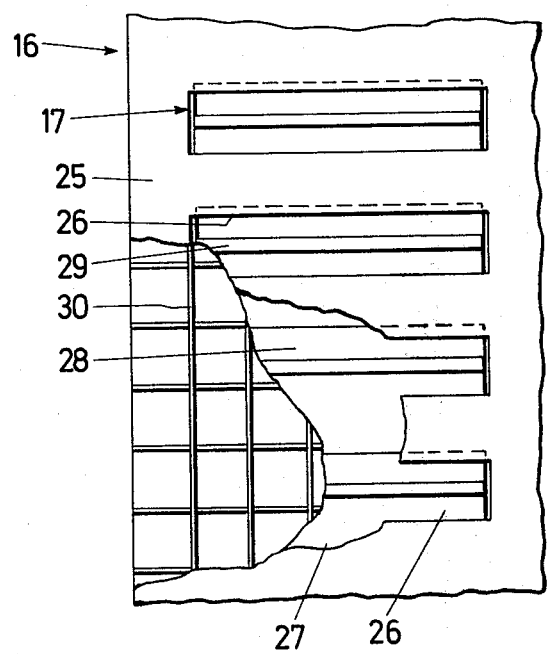
FIG. 4 shows the wall portion of FIG. 3 from the left, portions being broken away.

One factor which surprisingly contributes substantially to the uniform baking of the food products 15A on the trays 15, although the reason why is not definitely known, is the particular design of the side walls 16 shown in larger scale in FIGS. 3 and 4. As will be seen from these figures, the side walls 16 each comprise three main parts, namely a planar plate 25 having a plurality of elongated horizontal slots 26, a plate 27 engaging the plate 25 face to face on the side of the latter facing away from the baking chamber 13 and having similar slots 28 defined at the bottom thereof by outwardly punched tongues 29 inserted through the slots 26 in the plates 25, the tongues extending inwardly into the baking chamber 13 and slightly upwardly, and finally a grid structure 30 constructed of narrow sheet metal strips disposed edgewise in engagement with the outer side of the plate 27. The plates 25 and 27 are vertically displaceable relative to each other in a known manner, so that the size of the open through-flow openings between the upper edge of the slots 26 and the upper surface of the tongues 29 can be varied.

The strips forming the grid structure 30 are relatively narrow — a width of 10 to 15 mm is normally sufficient — and are arranged in spaced relationship at intervals approximately equal to their width. Optionally the spacing of the horizontally extending strips may be substantially greater than the width of the strips but the spacing of the vertically extending strips should be of the same order of magnitude as the width of the strips. The grid structure 30 serves mainly as an air directing device which ensures that the circulating air flowing in the air passage 20 along the side wall 16 passes through the side wall into the baking chamber 13 in a direction at least approximately perpendicular to the side wall.

Figure 2:
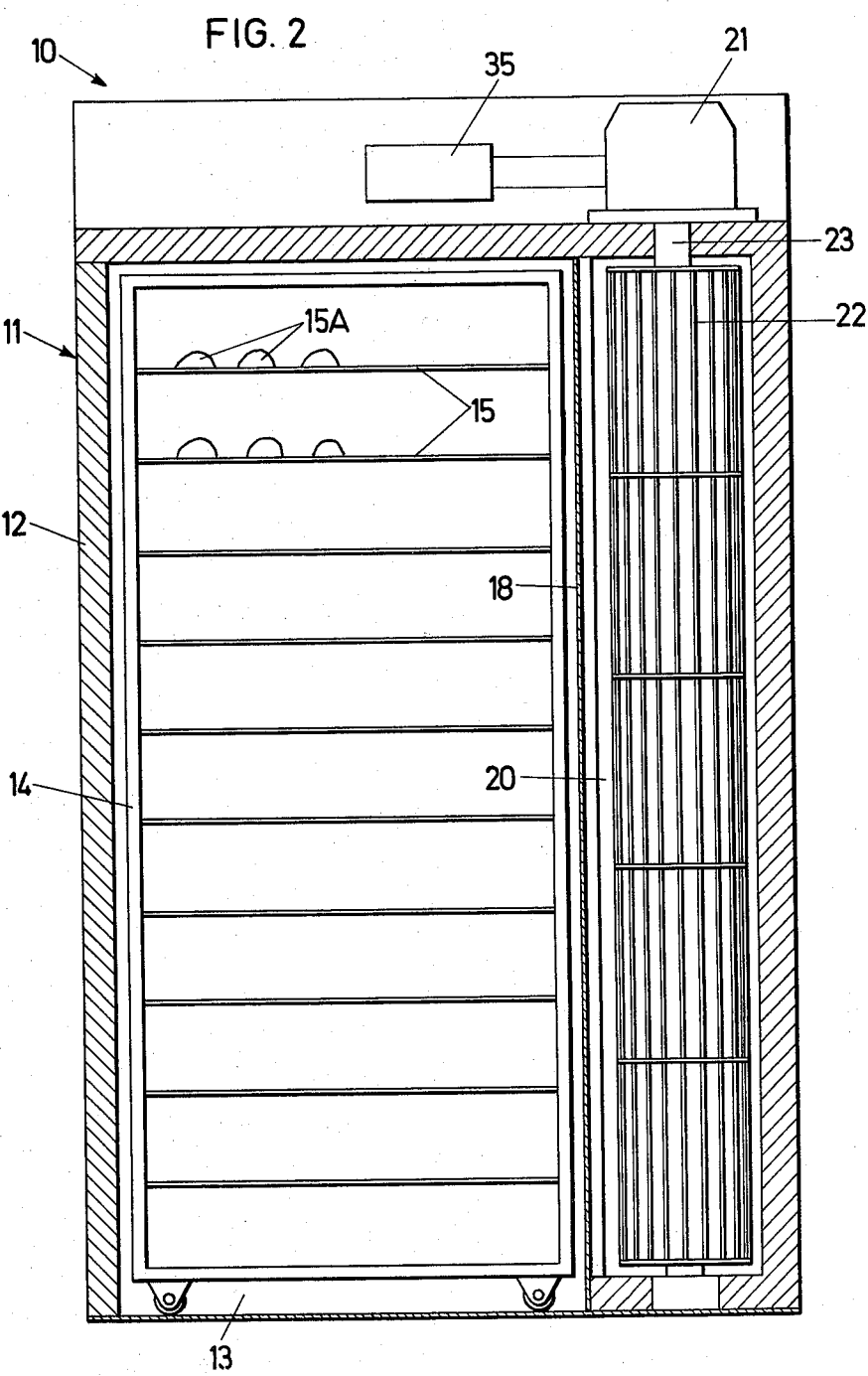
FIG. 2 is a vertical sectional view along line II—II in FIG. 1.

During the baking of the food products 15A on the rack 14 in the baking chamber 13, the oven 10 is operated through repetitive baking cycles under the control of a conventional control timer represented by a block 35 in FIGS. 1 and 2 on the drawings. The structure of the control timer will become apparent from the following description of its timer program for a particular baking cycle, and as will be readily understood, the control device can be constructed from standard components by any person of ordinary skill, and is equivalent to a conventional domestic appliance timer, and hence no detailed description of the structure of the control timer is believed necessary.

The operation of the baking oven 10 during a baking cycle is described with reference to FIGS. 5 to 7 which show in a rather diagrammatic way the flow pattern of the circulating air during three successive phases of the baking cycle, it being assumed that the flow pattern is as illustrated in these figures in all horizontal cross-sections through the baking chamber 13. The switching from one phase of the baking cycle to next is effected by the control device 35 which switches the fan motors 21 on and off. The duration of the baking cycles and of the individual phases are chosen in each particular case on the basis of the type of baking to be effected, the nature of the food products to be baked, the total baking time, the baking temperature, and so on. For the sake of simplicity, it is assumed here that the time taken for a single baking cycle is one minute.

During the first phase of the baking cycle (FIG. 5), the left fan motor 21 is energized by the control device 35 to rotate its fan rotor 22 counterclockwise. The right fan motor 21 is deenergized and the associated fan rotor 22 is rotating idly in the counterclockwise direction under the action of the air flow produced in the air passage 20 by the left fan rotor 22. The air flow produced by the left fan rotor passes horizontally into the baking chamber 13 through the openings 17 in the left side wall 16 (the air is distributed over substantially the entire surface of the side wall), and the major portion of the air flows horizontally across the baking chamber as indicated by straight arrows 31 and then passes horizontally out of the baking chamber 13 through the openings 17 in the right side wall 16 into the right branch of the air passage 20 and flows through the right fan rotor 22 and the heater 24 back to the left fan rotor 22.

A minor portion of the air flow, however, passes horizontally directly back from the baking chamber 13 to the air passage 20 in the vicinity of the heater 24 through the air outlet 19 in the rear side wall 18. This short-circuit flow has been symbolized in a simplified manner with an arrow 32 in FIG. 5.

After slightly less than half the cycle period has passed, for example after approximately 27 seconds in the assumed case, the motor 21 of the right fan rotor 22 is energized to drive that fan rotor clockwise, while the motor 21 of the left fan rotor 22 continues to drive that rotor counterclockwise, see FIG. 6. The two fan rotors will thus propel the air from opposite directions into the baking chamber 13 through the side walls 16, and the whole of the air flow will thus leave the baking chamber through the air outlet 19 in the rear side wall 18.

After approximately half the cycle period, thus roughly after a further 3 seconds, the motor of the left fan rotor is deenergized, while the motor of the right fan rotor continues to rotate its fan rotor clockwise. The left fan rotor will gradually stop, after a further one or more seconds, and will then begin to rotate clockwise under the influence of the air flow produced by the right fan rotor. As will be seen from FIG. 7, the air will then flow in the same manner as in the first phase illustrated in FIG. 5, but with the major portion of the air flowing in the opposite direction.

After roughly 57 seconds have passed, the motor of the left fan rotor is again energized, so as to re-establish the flow pattern shown in FIG. 6. After approximately a further 3 seconds, the baking cycle is completed and the next baking cycle is begun by again deenergizing the motor of the right fan rotor, so that only the left fan rotor is driven and the flow pattern shown in FIG. 5 is again established.

With the illustrated embodiment, each baking cycle comprises four sequential phases, namely two long or main phases (FIG. 5 and 7), which differ from each other only with respect to the direction of flow of a major portion of the air flow, and two short, identical intermediate or transition phases separating the main phases. Since the intermediate or transition phases to a certain extent represent a power loss, they should, in principle, be as short as possible, although they must be of sufficient duration to produce the desired effect. Roughly, the duration of the intermediate or transition phases should be between 5 and 25 percent of the duration of the main phases, 10 percent having been found in many cases to be suitable.

The deflected portion of the air flow passing out through the air outlet 19 in the rear side wall 18 is also, in certain respects, ineffective and should therefore be as small as possible. As with the duration of the intermediate or transition phases, however, certain concessions must be made in order to obtain the desired equilization. An advantageous compromise is normally achieved if the deflected portion is at most 25 to 30 percent of the total air flow. In the majority of cases a deflected flow of no more than 15 percent of the total air flow is sufficient.

What is claimed is:
1. An oven for baking food products, comprising:
 a. a thermally insulated enclosed housing having a vertical door;
 b. first and second opposed apertured vertical side walls extending from said door in horizontally spaced relation to the interior of said housing;
 c. a third apertured vertical side wall extending between said first and second side walls in horizontally spaced relation to the interior of said housing, said vertical side walls and said door jointly defining a baking chamber therebetween;
 d. a pair of fans of the cross-flow type, one disposed to direct its driven output to the space between said housing and said first vertical side wall, and the other disposed to direct its driven output to the space between said housing and said second vertical side wall, both disposed to have their low pressure side communicate with the space between said housing and said third vertical side wall;
 e. a control timer connected to operate said fans singly and jointly; and
 f. means in said housing outside said chamber for conditioning air.

2. An oven according to claim 1 in which said fans are respectively mounted for rotation about spaced vertical axes in said housing located exteriorly of said baking chamber and adjacent the side edges of said third vertical side wall.

3. An oven according to claim 1 in which said fans and said spaces are substantially vertically co-extensive with said baking chamber.

4. An oven according to claim 1 in which the apertures of said first and second side walls are distributed over substantially the entire area thereof, and the apertures of said third wall are disposed substantially co-extensively with the vertical extent of said baking chamber.

5. An oven according to claim 1 in which the effective flow area of the apertures in said third vertical wall does not exceed 30 percent of the effective flow area of the apertures in either of said first or second side walls.

6. An oven according to claim 1 including:
 a. means for adjusting the effective size of the apertures in said first and second vertical side walls;
 b. a lip at the lower edge of each of said last mentioned apertures, said lip being directed inwardly of said baking chamber and slightly upwardly; and
 c. means at the side of said first and second vertical side walls remote from said baking chamber for straightening air flow to be horizontal as it reaches said first and second vertical side walls.

* * * * *